United States Patent Office 3,397,203
Patented Aug. 13, 1968

3,397,203
METHODS OF PRODUCING CHLORO-
CYANURIC ACIDS
William F. Symes, Webster Groves, and Steve Vazopolos, St. Louis, Mo., assignors to Monsanto Company, St. Louis, Mo., a corporation of Delaware
No Drawing. Filed Aug. 25, 1966, Ser. No. 574,941
12 Claims. (Cl. 260—248)

The present invention relates to cyanuric acid and chlorocyanuric acids (including chloroisocyanuric acids) particularly trichlorocyanuric and dichlorocyanuric acid. This invention has particular reference to purifying cyanuric acid and to improved novel processes of preparing trichlorocyanuric acid and dichlorocyanuric acid from said purified cyanuric acid.

The preparation of trichlorocyanuric acid or dichlorocyanuric acid is well known in the prior art as disclosed by the following publications.

It has been proposed heretofore in U.S. Patent 2,607,738 and U.S. Reissue Patent 24,412, issued to Edgar E. Hardy on Aug. 19, 1952, and on Dec. 31, 1957, respectively, to prepare trichlorocyanuric acid by dissolving cyanuric acid in the theoretical quantity of a 5% solution of caustic soda or potash and treating the resulting solution with chlorine until three atoms of alkali have been substituted by chlorine. However, Chattaway and Wardmore, in the Journal of the Chemical Society, vol. 81, pp. 200–202, point out that, where relatively large quantities of reactants are used in the chlorination of cyanuric acid dissolved in the theoretical quantity of potash, low product yields and products low in available or active chlorine are obtained. Thus, the foregoing batch process is not adaptable to large scale commercial production.

It has also been proposed heretofore in U.S. Patent 2,964,525, issued Dec. 13, 1960, to William L. Robinson to prepare trichlorocyanuric acid by continuously chlorinating an aqueous solution of trisodium cyanurate at a pH of not more than 4.5 and at temperatures below 50° C. and to prepare dichlorocyanuric acid by continuously chlorinating an aqueous solution of dipotassium cyanurate at a pH of not more than 4.5. (The trisodium cyanurate is prepared, for example, by reacting about 3 moles of sodium hydroxide with 1 mole of cyanuric acid.) Trichlorocyanuric acid and dichlorocyanuric acid can generally be obtained in pure form and in high yields using the processes of the Robinson patent.

It has further been proposed heretofore in U.S. Patent 3,178,429, issued Aug. 13, 1965, to Steve Vazopolos to prepare trichlorocyanuric acid by continuously chlorinating an aqueous dispersion of tricalcium dicyanurate at temperatures below 50° C. until the pH of the dispersion or resulting reaction mixture is below 4.0. Furthermore, dichlorocyanuric acid may be prepared, according to this patent, by chlorinating an aqueous dispersion of monocalcium mono-cyanurate at temperatures below 50° C. until the pH of the dispersion is below 4.0. (The tricalcium dicyanurate and mono-calcium mono-cyanurate are respectively prepared by reacting, for example, calcium hydroxide with cyanuric acid in a molar ratio of 3:1 and 1:1.).

If cyanuric acid containing substantial amounts (e.g. 500 to 5,000 p.p.m.) of biuret is used as a raw material in the above described methods (particularly those methods described in U.S. Patents 2,964,525 and 3,178,429) of preparing trichlorocyanuric acid or dichlorocyanuric acid, the biuret interferes chemically and/or physically (or mechanically) with the subsequent process steps leading to the preparation of the chlorocyanuric acids, i.e. trichlorocyanuric acid and dihlorocyanuric acid, in a manner hereinafter described.

In the past, cyanuric acid has been prepared by a variety of procedures, the more common of which is to merely melt and heat, e.g., pyrolyze, urea at atmospheric pressure above the temperature range in which it decomposes. (Urea is produced commercially by the reaction of ammonia and carbon dioxide.) After this synthesis, urea can then be calcined and/or pyrolyzed in order to convert it to the crude cyanuric acid. In this latter step, urea may be in a variety of forms including, for example, powdered urea, bulk urea, or an aqueous solution usually containing 70% or more by weight of urea. This latter step of pyrolysis and/or calcination of urea, to convert it to cyanuric acid, may be carried out by a process as described in U.S. Patent 2,943,088, issued June 28, 1960, to Richard Howard Westfall, or alternatively, the urea may be converted to urea cyanurate which is then heated to form cyanuric acid as described in U.S. Patent 3,154,545, issued Oct. 27, 1964, to William F. Symes and Steve Vazopolos. The crude cyanuric acid produced by the process set forth in U.S. Patents 2,943,088 or 3,154,545 may then be hydrolyzed to substantially purify said acid. However, even after this hydrolysis, there are substantial amounts, e.g. 1000 p.p.m., of biuret in the "purified" cyanuric acid.

When substantial quantities, e.g. 1,000 p.p.m., of biuret remain in the cyanuric acid which is used to subsequently prepare the aforementioned chlorocyanuric acids, certain operational problems are encountered and the chlorocyanuric acids produced have certain undesirable properties. Specifically, when such cyanuric acid is contacted with a metallic compound, hereinafter defined, and the resultant reaction mixture chlorinated, the specific chlorocyanuric acid formed therefrom normally consists of very small (crystals) particles, e.g. 80% by weight pass through a No. 200 mesh U.S. Standard screen (the desired maximum passing through said screen is 20%). Consequently, these small crystals never grow to an acceptable size under continuous process conditions with the result that aqueous slurries of such crystals have poor filtration characteristics and, on filtration, yield "high moisture" filter cakes. The drying of these "high moisture" filter cakes generally results in a significant amount of decomposition of the triazine ring of the chlorocyanuric acid and thus promotes the formation of nitrogen trichloride. Nitrogen trichloride is well known in the art as being a noxious material which is a hazardous explosive and is also poisonous. Its formation, in significant quantities in a commercial production facility, constitutes a hazard to personnel as well as property. Furthermore, the destruction of chlorocyanuric acid through the decomposition of the triazine ring, results in materially lower yields of said acid. Thus, it can readily be seen that there is a definite need for a process of removing biuret from cyanuric acid or, alternatively, to negate the above mentioned undesirable results which flow from the use of cyanuric acid containing biuret in the production of chlorocyanuric acid. The prior art has neither recognized nor solved this "biuret problem."

The present invention provides a novel process which overcomes the aforementioned disadvantages in the prior art processes and results in the production of purified cyanuric acid and chlorocyanuric acids in good yields and which are characterized by having large crystals, i.e. a particle size such that less than 20% by weight of the particles pass through a No. 200 mesh U.S. Standard screen.

Accordingly, it is one object of the present invention to provide an economically and commercially practicable method for removing biuret as an impurity from cyanuric acid.

It is another object of the present invention to provide a process for preparing chlorocyanuric acids which process substantially reduces or eliminates the disadvantages or potential disadvantages of the prior art methods discussed above.

It is a further object of the present invention to provide an improved process for producing trichlorocyanuric acid and dichlorocyanuric acid from cyanuric acid containing signifiant quantities of biuret.

Other objects and advantages of the present invention will become apparent from the following description and the appended claims.

In general, the present invention, in part, provides a process for purifying cyanuric acid containing substantial quantities, for example, at least 200 p.p.m. (preferably from 500 to 5,000 p.p.m.), of biuret as an impurity therein which comprises reacting an aqueous solution containing a metallic compound from the group consisting of alkali metal hydroxides and alkaline earth metal hydroxides, oxides, and carbonates with said cyanuric acid to form a metal salt cyanurate solution or slurry; contacting said cyanurate solution or slurry with a chlorine-liberating compound for a sufficient period of time to substantially decompose the biuret in such cyanurate solution without materially chlorinating the such cyanurate while continuously maintaining the pH of said cyanurate solution at not less than 10.5. The resulting cyanurate solution may be used as such or treated with an acid to form cyanuric acid. In the last mentioned procedure, the substantially biuret-free cyanurate solution may be reacted with a sufficient quantity of a mineral acid such as $H_2SO_4$, HCl, and the like to form an aqueous slurry of a substantially biuret-free, purified cyanuric acid which can be filtered and dried. (The term "purified cyanuric acid" as used herein generally connotates cyanuric acid which contains less than 200 p.p.m., preferably 100 p.p.m., biuret.)

The term (cyanurate) "solution" as used herein is intended to designate true or complete solutions as well as the dispersion or slurries referred to hereinafter. Thus and for exemplary purposes only, it will be noted that the reaction between an aqueous sodium hydroxide solution and cyanuric acid forms a solution of trisodium cyanurate whereas when potassium hydroxide or calcium hydroxide are reacted with cyanuric acid, there is formed a dispersion (or slurry), i.e. solids of dipotassium cyanurate or tricalcium dicyanurate, respectively, in a liquid phase. Thus, the term "solution" will be used herein in a broad sense and as a generic term to encompass true solutions and also dispersions.

While the above-described cyanurate solution, which has the biuret removed therefrom, can be treated to form purified cyanuric acid as mentioned above, the following description will be directed primarily to a detailed disclosure of chlorinating such cyanurate (solution or slurry) to form the di- and/or tri-chlorocyanuric acids.

Accordingly, another embodiment of the present invention relates to a process for preparing a polychlorocyanuric acid which comprises reacting an aqueous alkaline solution containing a metallic compound selected from the group consisting of alkali metal hydroxides and alkaline-earth metal hydroxides, oxides, and carbonates, with cyanuric acid, which contains significant quantities, i.e., at least about 200 parts per million (preferably about 500 to 5,000 p.p.m.) of biuret as an impurity therein, to form a metal salt cyanurate solution or slurry; contacting said cyanurate solution or slurry, which contains the biuret therein, with a chlorine-liberating compound for a sufficient period of time to substantially decompose the biuret in such cyanurate solution without materially chlorinating such cyanurate while continuously maintaining the pH and temperature of said cyanurate solution at not less than 10.5 and not more than 90° C., respectively, whereby the chlorine liberated from said compound decomposes said biuret into materials which do not significantly interfere, chemically or mechanically, with the subsequent process steps; and then subsequently contacting the resulting substantially biuret-free, metal salt cyanurate solution with a sufficient quantity of chlorine in a reaction zone which is maintained at a temperature less than 50° C., e.g. 0° C. or 10° C. to 50° C., to form at a pH less than 6.5 the aforementioned polychlorocyanuric acid.

The cyanuric acid used in the process of the present invention generally contains biuret in an amount in excess of 200 p.p.m., preferably in amounts of about 500 to about 5,000 p.pm., and more preferably in amounts from about 750 to about 2,000 p.p.m. It has been our experience, which is substantiated by the examples hereinafter set forth, that a biuret level of 200 p.p.m. of cyanuric acid is the minimum level necessary in order to obtain the benefits of the processes of the present invention.

As previously mentioned, it has been found that this biuret impurity can be removed from cyanuric acid, which is in the form of a metal salt of cyanuric acid (since cyanuric acid per se has a water solubility of only 0.28 gram per 100 grams of water at a water temperature of 20° C.), by contacting it with a chlorine-liberating compound, as hereinafter described in detail. Specifically, the metal salt of cyanuric acid is formed by reacting cyanuric acid with an aqueous alkaline solution containing a metallic compound from the group (a) alkali metal hydroxides and (b) alkaline earth metal hydroxides, oxides, and carbonates. The compounds falling within item (a) include hydroxides of the metals lithium, sodium, potassium, rubidium, cesium, and francium; however, sodium hydroxide is the preferred alkali metal hydroxide.

It is to be noted that the alkali metal hydroxides, preferably sodium hydroxide and potassium hydroxide (which are generally used as aqueous solutions having a hydroxide concentration of from 10% to 50% by weight), are the metallic compounds used as starting materials in U.S. Patent 2,964,525 to subsequently prepare the chlorocyanuric acids. Specifically, the sodium hydroxide is reacted with cyanuric acid, usually in a molar ratio of $NaOH:C_3N_3O_3H_3$ of about 3:1, to form trisodium cyanurate ($C_3N_3O_3Na_3$) which is, after removing the biuret in the novel manner herein described, chlorinated to produce trichlorocyanuric acid. On the other hand, potassium hydroxide is reacted with cyanuric acid, usually in a molar ratio of $KOH:C_3N_3O_3H_3$ of about 2:1, to form dipotassium cyanurate ($C_3N_3O_3K_2H$) which is also, after removing the biuret, chlorinated to then produce dichlorocyanuric acid. (Bother of these final chlorination steps are more specifically described hereinafter.)

In conjunction with the utilization of potassium hydroxide, it is to be understood that if tripotassium cyanurate is prepared by reacting 3 moles of KOH with 1 mole of cyanuric acid and then chlorinated at a pH of between 2.1 and 6.0, then the present invention also covers an improved process of preparing crystalline [(mono - trichloro) tetra - (monopotassium dichloro)] pentaisocyanurate, (mono-trichloro), (monopotassium dichloro) di-isocyanurate, and mixtures thereof. This process (without the novel removal of biuret) is described in U.S. Patent 3,150,132, issued on Sept. 22, 1964, to William F. Symes; and this patent should be considered as incorporated herein by reference. However, since the novel aspect of the present invention relates to the removal of biuret from cyanuric acid which is in the cyanurate form, the type cyanurate, for example, dipotassium or tripotassium cyanurate, being treated by the instant invention is not critical since any cyanurate solution containing biuret therein as an impurity can be "purified"; that is, the biuret content thereof can be substantially reduced or eliminated. Furthermore, the disposition of the "purified cyanurate solution" after biuret removal is also not critical and said cyanurate can be treated to form cyanuric acid, dichlorocyanuric acid or the salts thereof, trichlorocyanuric acid, or the above-mentioned compounds of U.S. 3,150,132. In brief cyanurate solutions are useful products from which a variety of useful compounds can be prepared by procedures known in the art.

With more particular reference to the above (metallic compound) item (b), it will be noted that the alkaline-earth metal hydroxides, oxides or carbonates are utilized as starting materials in U.S. Patent 3,178,429 to ultimately produce the chlorocyanuric acids. Specifically, these metallic compounds may be reacted, in various amounts hereinafter pointed out, with cyanuric acid to form an alkaline-earth metal cyanurate, which may, after removal of the biuret by the novel processes hereinafter described, be chlorinated to produce the desired chlorocyanuric acid.

The above mentioned alkaline-earth methal cyanurates may be prepared by a number of methods such as, for example, by reacting an alkaline-earth metal carbonate with cyanuric acid, but are most desirably prepared by bringing together and reacting an alkaline earth metal oxide or hydroxide, in the form of an aqueous slurry, with an aqueous slurry of cyanuric acid or with solid cyanuric acid, in the molecular proportions necessary to obtain the desired alkaline-earth metal salt of cyanuric acid. Thus, for example, where it is desired to prepare a trialkaline-earth metal dicyanurate, and aqueous slurry containing three molecular proportions of an alkaline-earth metal hydroxide is mixed and reacted with an aqueous slurry containing two molecular proportions of cyanuric acid. By so proceeding, an aqueous alkaline dispersion of the trialkaline-earth metal di-cyanurate, in the form of a dispersed solid, usually having a pH of between 12.5 and 12.6 is formed, and chlorine can, after the biuret removal step (i.e. the decomposition of biuret by contact with a chlorine-liberating compound such as trichlorocyanuric acid at a pH not less than 10.5), then be introduced into such slurry to prepare trichlorocyanuric acid. On the other hand, when it is desired to prepare a mono-alkaline-earth metal mono-cyanurate, an aqueous slurry containing one molecular proportion of an alkaline-earth metal oxide or hydroxide is usually mixed and reacted with an aqueous solution or slurry containing one molecular proportion of cyanuric acid. By so proceeding, an aqueous alkaline dispersion of mono-alkaline-earth metal mono-cyanurate in the form of a dispersed solid is formed which usually has a pH from 12.0–12.1, which can, after the biuret removal step, then be chlorinated with chlorine as herein described to produce dichlorocyanuric acid.

The concentration of alkaline-earth metal oxide or hydroxide in the slurry which is added to the cyanuric acid slurry may vary to some extent but an aqueous slurry containing from 10% to 35% by weight preferably 25% to 35% by weight of alkaline-earth metal hydroxide has been found particularly useful. The concentration of cyanuric acid in the aqueous solution or slurry or cyanuric acid to which the alkaline-earth metal hydroxide slurry is added may also vary to some extent but a slurry containing from 5% to 25%, preferably 15% to 25% by weight of cyanuric acid has been found especially desirable.

Although any of the group of alkaline-earth metal salts of cyanuric acid or mixtures thereof may be used to prepare chlorocyanuric acids in accordance with the processes of the present invention, the calcium, magnesium, and barium salts of cyanuric acid are preferred and calcium salts are particularly preferred.

The alkaline-earth metal cyanurates which are employed in the process of the present invention are relatively insoluble in water at ordinary temperatures, that is, 20° C.–25° C., being water soluble only to an extent of 0.1% to 0.2% by weight at such temperatures. The water solubility of these alkaline-earth metal cyanurates is unexpectedly less than 0.1 to 0.2% at higher temperatures. Thus at temperatures of 50° C., less than 0.1% by weight of such cyanurates will dissolve in water and this solubility property is contrary to the solubility of alkali-metal cyanurates which have significantly increased solubilities at elevated temperatures.

Although relatively insoluble in water, the aqueous alkaline dispersions of alkaline-earth metal cyanurates, which are employed in the preparation of the chlorocyanuric acids in accordance with the processes of the present invention, almost always have a pH above 12.0 and often have a pH above 12.5. The pH of such aqueous dispersions is also not substantially affected by the concentration of the alkaline-earth metal cyanurate dispersed therein. Thus, for example, an aqueous dispersion containing 1% by weight of tricalcium dicyanurate will generally have a pH of 12.5 and an aqueous dispersion containing 30% by weight of triacalcium dicyanurate will have a pH of 12.6. On the other hand, an aqueous dispersion containing 1% up to 30% by weight of monocalcium mono-cyanurate will usually have a pH of 12.0–12.1.

The concentration of alkaline-earth metal cyanurate in the aqueous alkaline dispersions which can be chlorinated, after biuret removal, with chlorine in accordance with the process of the present invention, may vary to a considerable extent, say from 10% to 30% by weight of alkaline-earth metal cyanurate but is preferably in the range of from 15% to 30%. It is particularly preferred to use an aqueous dispersion containing from between 20% to 25% by weight of alkaline-earth metal cyanurate in the form of a dispersed solid and between 75% and 80% of water. At higher concentrations of alkaline-earth metal cyanurates, e.g., 20% to 30% by weight, such dispersions have thixotropic properties, that is, they will form gel-like solids upon standing. These gel-like solids can be transformed into the original liquid state by agitation, preferaby by mechanical means.

Referring now more specifically to one embodiment of the present invention, the metal salt of cyanuric acid, i.e. the alkali and/or alkaline-earth metal salt cyanurate, herein also referred to as cyanurate for the sake of brevity, is prepared by one of the aforementioned methods in the form of an aqueous alkaline solution having a pH above 10.5, preferably between 12 and 13.8. It is to be noted that the pH of said solution is quite critical in that if the pH falls below 10.5, e.g. below 10, only small insignificant amounts of biuret are removed from the cyanurate solution over an extended period of time, e.g. 5 hours, upon contact with the subsequently described chlorine-liberating compound. Thus, it can readily be seen that the said cyanurate solution should not be below 10.5, and should preferably be within the aforedefined pH range. The pH range is generally maintained by adding an alkaline solution such as, for example, a 50% NaOH solution to the cyanurate solution during the biuret removal therefrom.

In the above-described aqueous alkaline solution, the cyanurate is then contacted with a chlorine-liberating compound for a sufficient period of time to substantially decompose the biuret in said cyanurate solution. This time period is generally about at least 5 minutes, preferably from about 7 to about 30 minutes, whereby such compound liberates "available chlorine" and the biuret contained in said cyanurate solution is thus decomposed. The amount of said chlorine-liberating compound utilized should be sufficient to decompose the biuret but insufficient to significantly chlorinate the cyanurate compound. This amount will vary depending on temperature, the solubility of the cyanurate, and the amount of biuret present but is preferably sufficient to provide a weight (p.p.m.) ratio, i.e. parts per million parts of cyanurate, of the chlorine-liberating compound to biuret of from about 1.5:1 to about 4:1, preferably from about 2:1 to about 3:1. It is also preferred that the aqueous alkaline cyanurate solution be maintained at a temperature not more than 90° C., preferably from about 10° C. to about 75° C., during the time that the said chlorine-liberating compound is contacted with said cyanurate solution. It is to be noted that the chlorine released, i.e. available chlorine, from said compound is the ingredient which it is believed attacks and consequently decomposes the biuret.

The term "available chlorine" as employed herein is used in its usual technical meaning as employed in the sodium hypochlorite art wherein the "available chlorine" in a given compound is determined by analyzing for the amount of chlorine that can be liberated from the compound by treatment with an aqueous acid solution.

The chlorine-liberating compound which is employed in the present invention may be any of a wide variety of compounds which liberate chlorine when contacted, for example dissolved or dispersed, with an aqueous solution. Suitable chlorine-liberating compounds may include sodium hypochlorite, potassium hypochlorite, calcium hypochlorite, chlorine per se (either in a gaseous or liquid form), trichlorocyanuric acid, dichlorocyanuric acid, and a polychlorocyanurate which contains a metal cation in the molecular structure along with at least one isocyanurate or cyanurate ring and at least two chlorine atoms. As examples of a particularly suitable group of polychlorocyanurates which may be employed in the novel processes of the present invention, there may be mentioned the following compounds:

(1) sodium dichloroisocyanurate and hydrates thereof;
(2) potassium dichloroisocyanurate and hydrates thereof;
(3) [(monotrichloro) (monopotassium dichloro)] di-isocyanurate;
(4) [(monotrichloro) tetra-(monopotassium dichloro)]
(5) magnesium di(dichloroisocyanurate) and hydrates thereof;
(6) calcium di(dichloroisocyanurate) and hydrates thereof;
(7) mono-magnesium, di-potassium tetra(dichlorocyanurate) and hydrates thereof;
(8) mono-zinc, dipotassium tetra-(dichlorocyanurate) and hydrates thereof;
(9) mono-magnesium, di-rubidium tetra-(dichlorocyanurate) and hydrates thereof; and
(10) mono-zinc, di-rubidium tetra-(dichlorocyanurate) and hydrates thereof.

It is also within the scope of the present invention that mixtures of the aforementioned chlorine-liberating compounds may be used if one so desires.

The above compounds, i.e. the polychlorocyanurates and processes for producing the same are disclosed in U.S. Patents 3,035,054, 3,035,056, and 3,035,057 (as to compounds numbered 1 and 2); 3,150,132 (as to compounds numbered 3 and 4); 3,221,014 (as to compound numbered 5); and 3,072,654 (as to compound numbered 6). The compounds numbered 7-10 and processes for producing the same are disclosed in application for Letters Patent Ser. No. 221,307, filed Sept. 4, 1962, which application is assigned to the same assignee as the present application. In order to avoid the enlargement of the specification, the above patents and patent application should be considered as incorporated herein by reference.

The metal cation which is present in the molecular structure of the aforementioned polychlorocyanurates is preferably one of the metals of Groups I-A, II-A, and II-B of the Periodic Table of the Elements and includes such metals as lithium, sodium, potassium, rubidium, cesium, francium, barium, strontium, calcium, magnesium, and zinc.

It will be noted throughout the present specification that various chemical terms are used interchangeably, specifically those relating to the polychlorocyanurates. For example, the compounds "sodium dichloroisocyanurate" and "sodium dichlorocyanurate" are the same compounds but connotate different tautomeric forms thereof. Consequently, both of these chemical terms are intended to mean the same compound and are used interchangeably herein.

The reaction mechanism between the biuret (contained in the said cyanurate solution) and the chlorine-liberating compound is not completely known; however, it has been observed that when such a reaction occurs, gaseous materials are evolved from the reaction mixture. This gaseous material has been analyzed and found to contain such common gases as carbon dioxide and ammonia. (It is to be noted that these two latter gases are not to be considered as all inclusive of the composition of said gaseous material, but were merely the most quickly detected and recognized.) Consequently, it appears that the biuret is substantially decomposed into well-known gases and possibly into additional compounds, which have not been identified at the present time, which, in any event, do not physically and/or chemically interfere with, for example, the subsequent process steps of preparing the polychlorocyanuric acids which are characterized by having the aforementioned desired physical or chemical characteristics.

Notwithstanding the above and whatever the reaction mechanism may be, the applicant does not wish to be limited to any theories or ideas presented herein in connection with the operation of his novel processes.

The end result, as more specifically pointed out hereinafter with reference to the examples, of the reaction between the biuret in the cyanurate solution and a chlorine-liberating compound such as, for example, sodium hypochlorite or trichlorocyanuric acid, is a substantial removal of the biuret from the aforedefined cyanurate solution. For example, if an aqueous, alkaline solution containing 30% by weight trisodium cyanurate and 1,000 p.p.m. biuret, and having a pH of 13 is contacted with 2,000 p.p.m. dichlorocyanuric acid for 6 minutes, the biuret level is reduced to about 98 p.p.m. which is below the desired maximum of 200 p.p.m. Thereafter, the substantially biuret-free trisodium cyanurate solution may then be either contacted with a mineral acid, e.g. $H_2SO_4$, to produce a purified cyanuric acid, or said cyanurate solution may be chlorinated to a pH below 4.3 to produce trichlorocyanuric acid having a particle size such that less than 15% by weight thereof pass through a No. 200 mesh U.S. Standard screen.

After the alkali or alkaline-earth metal cyanurate solution has been "purified" by the removal of substantial amounts of biuret, said solution may then be used as such, converted to purified cyanuric acid, or chlorinated by different processes herein referred to. Thus, if the solution contains an alkali metal cyanurate such as, for example, trisodium cyanurate, trichlorocyanuric acid can be prepared according to the process of U.S. Patent 2,964,525, previously referred to herein and which is incorporated herein by reference. One embodiment of the present invention relates to a process for preparing a chlorocyanuric acid utilizing the hereinbefore described biuret decomposition step and the general cyanurate chlorinating procedure described in U.S. Patent 2,964,525. In brief this embodiment comprises (1) reacting an aqueous alkaline solution containing a metal compound from the group consisting of alkali metal hydroxides and alkaline-earth metal hydroxides, oxides, and carbonates, with cyanuric acid, which contains at least about 200 p.p.m. biuret as an impurity therein, to form the corresponding metal cyanurate solution; (2) contacting such cyanurate solution, which contains the biuret therein, with a chlorine-liberating compound for a sufficient period of time to substantially decompose the biuret in said cyanurate solution without materially chlorinating the said cyanurate while continuously maintaining the pH and temperature of said cyanurate solution at not less than 10.5 and not more than 90° C., respectively, whereby the chlorine liberated from said compound decomposes said biuret into materials which do not chemically or mechanically interfere with the subsequent process steps; and (3) subsequently contacting the substantially biuret-free, metal salt cyanurate solution with a sufficient quantity of chlorine in a reaction zone which is maintained at a temperature less than 50° C. and at a pH less than 4.5 to form the aforementioned chlorocyanuric acid. In carrying out such process, when the metal compound is sodium hydroxide the quantity of such hydroxide used to form the cyanurate is preferably sufficient to form a feed solution of trisodium cyanurate. This cyanurate can then be maintained at a pH of 12 to 13.8 and at a temperature of 10° C. to 75° C. during the time, which is at least 5 minutes, a chlorine-liberating compound such as trichlorocyanuric acid is contacted with the cyanurate solution in an amount sufficient to decompose the biuret therein without materially chlorinating the cyanurate compound. Thereafter the substantially biuret-free cyanurate solution is contacted with chlorine to form trichlorocyanuric acid. On the other hand if the metal compound used is potassium hydroxide, the feed solution is preferably formed by reacting such hydroxide with sufficient amounts of cyanuric acid to form dipotassium cyanurate having a molar ratio of KOH to cyanuric acid of about 2:1. After the biuret is decomposed by the above procedure or by using dichlorocyanuric acid as the biuret decomposing compound, such dipotassium cyanurate solution is contacted with chlorine to produce dichlorocyanuric acid.

Another embodiment of the present invention relates to a process for preparing [(mono-trichloro) tetra-(monopotassium dichloro)] penta-isocyanurate or (mono-trichloro) (monopotassium dichloro) di-isocyanurate utilizing the hereinbefore described biuret decomposition step and the cyanurate chlorination procedure described in U.S. Patent 3,150,132. This embodiment comprises (1) reacting an aqueous solution of potassium hydroxide with a sufficient amount of cyanuric acid, which contains at least about 200 p.p.m. biuret as an impurity therein, to form an aqueous solution of tripotassium cyanurate; (2) contacting said cyanurate solution, which contains the biuret therein, with a quantity of the aforementioned penta-isocyanurate (which supplies available chlorine to said solution) for a period of time of from about 7 to about 30 minutes, whereby the biuret in said cyanurate solution is substantially decomposed without materially chlorinating the said cyanurate, while continuously maintaining the pH and temperature of said cyanurate solution at from about 12 to about 13.8 and from about 10° C. to about 75° C. In step (2) chlorine is liberated from the pentaisocyanurate compound and decomposes the biuret into materials which do not chemically or mechanically interfere with the subsequent process steps and the quantity of penta-isocyanurate compound used is such as to provide a weight ratio of such penta-isocyanurate to biuret of from about 1.5:1 to about 4:1, preferably from about 2:1 to about 3:1. As step (3) the resulting tripotassium cyanurate solution or dispersion is contacted with a sufficient amount of gaseous chlorine in a reaction zone, which is maintained at a temperature of from about 0° C. to about 50° C., to form, at a pH of 4.3 to less than 6.0, the aforementioned penta-isocyanurate compound.

The di- and tri-chloro cyanuric acids can also be prepared by the process disclosed in U.S. Patent 3,178,429 previously referred to, and which is incorporated herein by reference in combination with the biuret decomposition process hereinbefore described. One embodiment of such a process comprises (1) reacting an aqueous slurry containing calcium hydroxide with cyanuric acid, which contains at least about 200 p.p.m. biuret as an impurity therein, in a molar ratio of about 3:2 to form an aqueous alkaline slurry of tricalcium dicyanurate; (2) contacting such dicyanurate slurry, which contains the biuret therein, with trichlorocyanuric acid, which is used in an amount sufficient to provide a weight ratio of trichlorocyanuric acid to biuret of from about 1:5:1 to about 4:1, for at least 5 minutes whereby the biuret in the tricalcium dicyanurate slurry is substantially decomposed without materially chlorinating the tricalcium dicyanurate slurry which is continuously maintained at a pH of about 12 to about 13.8 and a temperature from about 10 to about 75° C., respectively, whereby the chlorine liberated or that which is available in solution from the trichlorocyanuric acid decomposes the biuret into materials which do not chemically or mechanically interfere with the subsequent process steps; and (3) subsequently contacting the substantially biuret-free tricalcium dicyanurate slurry with a sufficient quantity of chlorine in a reaction zone which is maintained at a temperature of from about 0° C. to about 50° C. to form at, a pH less than 4.0 trichlorocyanuric acid.

In addition to using the low biuret content cyanurate solutions or cyanuric acid, produced in accordance with the processes described herein, for the manufacture of dichlorocyanuric or trichlorocyanuric acid using the processes of the patents referred to above, it is also possible to use such solutions or cyanuric acid in the preparation of the following products:

(a) Dichlorocyanuric acid using the procedure of U.S. Patents 2,969,360, 2,985,655, 3,073,823, and 3,120,522.

(b) Salts of dichlorocyanuric acid using the procedure of U.S. Patents 3,035,054, 3,035,056, 3,035,057, 3,072,654, 3,221,014, and 3,249,498.

(c) Trichlorocyanuric acid using the procedure of U.S. Patents 2,938,032, 2,956,056, 2,969,360, 2,970,998, 2,975,-178, 2,985,655, 3,073,823, 3,120,522, 3,184,458, and 3,189,609.

(d) Complexes of chlorinated cyanuric acids using the procedure of U.S. Patents 3,055,889, 3,094,525 and 3,150,-132.

(e) Melamine using the procedure of U.S. Patent 2,999,093.

(f) Trialkyl isocyanurate using the procedure of U.S. Patent 3,065,231.

(g) Cuprammonium cyanurate using the procedure of U.S. Patent 3,078,213.

(h) Tris-2-hydroxyalkyl isocyanurates using the procedure of U.S. Patent 3,088,948.

It is within the scope of the present invention to apply the unique and novel process described herein for the removal of biuret from cyanuric acid to the above-mentioned process patents which should be considered as incorporated herein by reference. It is to be noted that this list of patents is not all inclusive but merely for exemplary purposes only in order to point out the wide application of the present invention process.

The end result achieved by carrying out the steps of the novel processes of the preferred embodiment of the present invention (that is, the removal of biuret by chlorination followed by chlorination of cyanurate to form chlorocyanuric acid) is a substantially biuret-free, "chemical grade," chlorocyanuric acid which is characterized by having a relatively large particle size such that less than 20% of all the particles pass through a No. 200 mesh U.S. Standard screen. The chlorocyanuric acids such as trichlorocyanuric acid and dichlorocyanuric acid may be used directly as prepared (either in a wet or dried condition) or they may be further processed, e.g. treated with an alkali metal hydroxide to produce an alkali metal salt of the chlorocyanuric acid. The said chlorocyanuric acids, alkali metal salts thereof, other polychlorocyanurates which are characterized by having a metal cation in the molecular structure, and mixtures thereof generally constitute an "available chlorine-containing" compound which have utility as "active or available" chlorine containing materials, in oxidizing, sterilizing, bleaching, and sanitizing formulations, such as, for example, household laundry compositions, bleaches, scouring powders, and sanitizing and dishwashing compositions. Such formulations (or uses) are described, for example, in detail in the Hardy Patent U.S. 2,607,738 and U.S. Reissue Patent 24,412, U.S. 3,154,545, and U.S. 3,150,132.

A further understanding of the advantages and processes of the present invention will be obtained from the following examples which are intended to illustrate the invention but not to limit the scope thereof, parts and percentages being by weight unless otherwise specified.

Example I

One hundred and ten grams of sodium hydroxide were dissolved in 1,450 grams of water and the resulting product mixed with 104 grams of cyanuric acid, which contained 1,000 parts of biuret per one million parts of cyanuric acid, to form an aqueous solution of trisodium cyanurate. The molar ratio of NaOH to cyanuric acid was about 3.4:1. The 0.4 mol of NaOH in excess of that required to form trisodium cyanurate was employed in order to insure that the resulting cyanurate solution had a pH above 10.5; the pH of the solution being about 13.6. The resulting solution was filtered and cooled to a temperature of about 12° C. (A biuret analysis of a portion of the cyanurate solution disclosed the level of biuret to be approximately 995 parts per one million parts of the cyanuric acid in the trisodium cyanurate.) This cyanurate solution was then charged to a chlorination vessel which comprised a jacketed cylindrical glass container having an internal diameter of 5 inches and internal height of 13 inches, which container was provided with three (3) equidistantly spaced vertical baffles of 1 inch width spaced radially inward 1 inch from the inside wall of the container.

The capacity of the container was about one gallon. Mechanical agitation was provided by a shaft mounted coincident with the vertical axis of the container and provided with a six-blade turbine propeller of two inch diameter spaced two inches above the inside of the bottom of the container and a second six bladed turbine propeller of two inch diameter spaced five inches above the first mentioned propeller. The shaft and propellers were rotated at 2300 revolutions per minute, r.p.m., or a propeller tip speed of 1200 feet per minute. The container was also provided with a tube for introducing gaseous chlorine into the bottom thereof beneath the lowest propeller and was also provided with a tube for introducing additional liquids, such as, for example, an aqueous sodium hydroxide solution or an aqueous trisodium cyanurate solution, into the bottom thereof beneath the lowest propeller. The container was further provided with a tube extending vertically downward into the container a distance of 10 inches from the bottom thereof for the removal of the reaction products, hereinafter described. A fourth tube communicating with the container was employed in order that the pH of the contents of the container could be continuously measured.

After all of the aforementioned trisodium cyanurate solution had been charged into the container, a sufficient amount of gaseous chlorine was introduced, on a continuous basis, into the aqueous trisodium cyanurate solution, which had a pH of 13.6, in order to provide a weight ratio of chlorine to biuret of about 4:1 therein. The chlorine was continuously introduced into said container over a six-minute period. During the addition of the gaseous chlorine to the container, the pH of the trisodium cyanurate solution was continuously measured and when the pH thereof fell below 13.6, sufficient amounts of a 50% by weight aqueous, NaOH solution was added to raise the pH of the cyanurate solution to 13.6. The trisodium cyanurate solution was continuously agitated one minute prior, during, and one minute after the introduction the gaseous chlorine in order to insure complete and thorough contacting of the chlorine with the cyanurate. The cyanurate solution was also maintained at a temperature of about 25° C. by circulating brine at a temperature of −29° C. through the jacket of the container. Toward the end of the chlorination step, it was noted that gas bubbles were forming quite readily on the surface of the cyanurate solution. A portion of this gas was collected and analyzed and was found to contain $N_2$, $CO_2$, and $NH_3$.

After the chlorination, i.e., the biuret decomposition, had been completed, the cyanurate solution was agitated for one minute and then the agitator turned off, and a sample of the cyanurate solution removed in order that a biuret analyses could be made. The biuret level in the cyanurate solution was determined to be approximately 78 parts per one million parts of the cyanuric acid in the trisodium cyanurate. The substantially biuret-free trisodium cyanurate solution was then removed from said container and filtered. Approximately 10% by volume of said solution (cooled to a temperature of 1.5° C.) was then introduced into the container and chlorinated with a sufficient amount of chlorine to produce an aqueous heel comprising a slurry of trichlorocyanuric acid in an aqueous solution of sodium chloride, trisodium cyanurate and chlorine, the heel having a pH of 3.8–3.9.

The remainder of the trisodium cyanurate solution was cooled to a temperature of 1.5° C., and maintained at this temperature, and this solution was then introduced intermittently into the aqueous heel in the container at a rate of 5% by volume (based on the total cyanurate solution) per minute with agitation at the speed described above, and concurrently gaseous chlorine was introduced continuously into the aqueous heel in an amount of 3.5% in excess of $Cl_2$ theoretically required to react with the trisodium cyanurate into the container. The continuous agitation of the solution continuously dispersed the gaseous chlorine through the aqueous heel so that the pH was maintained at 3.8–3.9. The temperature of the aqueous heel in the container was maintained at 18–20° C. by circulating coolant through the jacket of the container. When the contents of the container rose to the level of the liquid removal tube mentioned above, the level of the aqueous heel in the container was mentioned constant by continually pumping a portion of the aqueous heel from the vessel containing trichlorocyanuric acid through the removal tube. The portion of aqueous heel thus removed was continuously supplied to a vacuum type drum filter where the trichlorocyanuric acid was easily removed in the form of a cake, while the bulk of the aqueous liquid containing sodium chloride and some chlorine was discarded. The filter cake consisted of trichlorocyanuric acid and about 1% of sodium chloride and less than 15% water based on the dry weight of the trichlorocyanuric acid. The drum filter was of sufficient size to permit water removal of the cake until it contained 5 to 6% by weight of moisture. The cake was then removed from the filter by means of a standard "doctor knife," washed with water to remove the major portion of sodium chloride therein and dried in an oven at 105° C. The yield of trichlorocyanuric acid was 97% based on the trisodium cyanurate employed, and this product contained in excess of 85% of available chlorine.

The sojourn time of the chlorine and aqueous solution of trisodium cyanurate supplied to the chlorination vessel varied between about 3 and 4 minutes. In this manner and the subsequent removal of the trichlorocyanuric acid from the major part of the aqueous phase, any material decomposition of the trichlorocyanuric acid was avoided.

The continuous process was carried out for 24 minutes without any difficulties in operation or without a decreased yield of trichlorocyanuric acid, but it is to be understood that the process is operable continuously over long periods of time.

Prior to the oven drying step mentioned above, a small portion of the wet filter cake, i.e., the trichlorocyanuric acid crystals, was used in order to conduct a particle size distribution analysis. Specifically, a 25 gram sample of the filter cake, which had been previously washed with water to remove NaCl, and with acetone to remove the water, was carefully spread out in an 8″ x 8″ x 1″ pan and then placed under a standard heat lamp for approximately 10 minutes in order to dry. The said trichlorocyanuric acid crystals were carefully patted with a spatula during the drying period in order to avoid destruction of the crystalline particle size and after the said acid crystals were dried by the heat lamp, a screen analysis was conducted thereon and the results are listed below.

Example I was repeated in the same manner as set forth above with the exception that the biuret removal step was omitted. (This repeat procedure is similar to the process disclosed in Example III of U.S. 2,964,525.) A 25-gram sample of the prewashed filter cake so produced was also dried in a similar manner as set forth immediately above and the results of a screen analysis of these (biuret-containing) trichlorocyanuric acid crystals are also shown below.

|  | Present Invention | Similar to Prior Art, e.g. U.S. 2,964,525 |
|---|---|---|
| Biuret Content, p.p.m. (based on cyanuric acid): |  |  |
| In cyanuric acid | 1,000 | 1,000 |
| In trisodium cyanurate: |  |  |
| (a) Before biuret removed | 995 | 991 |
| (b) After biuret removed | 78 | [1] 986 |
| Trichlorocyanuric Acid Particle Size Distribution | | |
| U.S. Standard Screen (cumulative values), percent: |  |  |
| On 100 mesh | 30 | 0 |
| On 140 mesh | 64 | 6 |
| On 170 mesh | 88 | 18 |
| On 200 mesh | 98.5 | 22 |
| −200 mesh | 1.5 | 78 |

[1] No biuret removal step employed.

The results set forth above vividly disclose the difference in crystalline particle size between the prior art processes of preparing trichlorocyanuric acid and the improved process of the present invention. It should also be pointed out that in the repeat of Example I wherein the biuret removal step was omitted, the slurry containing the freshly precipitated trichlorocyanuric acid particles was quite difficult to filter on the drum filter due to the significantly smaller size particles present therein. Furthermore, the overall yield of trichlorocyanuric acid, based on the amount of trisodium cyanurate employed was 93% as contrasted to the 97% yield obtained when the biuret was removed in Example I.

Example II

The procedure outlined and the equipment used in Example I was again repeated with the following exceptions. Potassium hydroxide was substituted for sodium hydroxide and used in an amount to form dipotassium cyanurate which had a molar ratio of 2:1 of KOH to cyanuric acid. The cyanuric acid utilized had a biuret content of 1475 parts per million parts of said acid. Finally, the available chlorine-containing compound used to remove the biuret was potassium dichlorocyanurate.

The above procedure was repeated without the biuret removal step and the results of Example II and this repeat thereof are shown below.

|  | Present Invention | Similar to Prior Art, e.g. U.S. 2,964,525 Example V |
|---|---|---|
| Biuret Content, p.p.m. (based on cyanuric acid): |  |  |
| In cyanuric acid | 1,475 | 1,475 |
| In dipotassium cyanurate: |  |  |
| (a) Before biuret removed | 1,461 | 1,470 |
| (b) After biuret removed | 98 | [1] 1,388 |
| Dichlorocyanuric Acid Particle Size Distribution | | |
| U.S. Standard Screen (cumulative values), percent: |  |  |
| On 100 mesh | 27 | 0 |
| On 140 mesh | 72 | 1 |
| On 170 mesh | 84 | 6 |
| On 200 mesh | 97.4 | 11 |
| −200 mesh | 2.6 | 89 |
| Dichlorocyanuric Acid Yield (based on the amount of dipotassium cyanurate employed) | 91 | 80 |

[1] No biuret removal step employed.

Example III

[(Mono-trichloro) tetra(monopotassium dichloro)] penta-isocyanurate was prepared by the following procedure.

Four hundred seventy-five grams of potassium hydroxide were dissolved in 4.2 liters of water and the resulting product mixed with 460 grams of cyanuric acid which contained 1275 p.p.m. of biuret therein to form an aqueous solution of tripotassium cyanurate. The amount of potassium hydroxide employed was about 0.14 mols in excess of that required to form tripotassium cyanurate and the pH of the cyanurate solution was about 13.7. (A biuret analysis of the tripotassium cyanurate disclosed the level thereof to be 1271 p.p.m. based on the cyanuric acid in said cyanurate.) The said tripotassium cyanurate was then charged into the chlorination vessel described in the above Example I.

After all of the aforementioned tripotassium cyanurate solution had been charged into the container, a sufficient amount of gaseous chlorine was introduced, on a continuous basis, into the aqueous tripotassium cyanurate solution, which had a pH of 13.7, in order to provide a weight ratio of chlorine to biuret of about 4:1 therein. The chlorine was continuously introduced into said container over a seven-minute period. During the addition of the gaseous chlorine to the container, the pH of the tripotassium cyanurate solution was continuously measured and when the pH thereof fell below 13.7, sufficient amounts of a 50% by weight aqueous KOH solution was added to raise the pH of the cyanurate solution to 13.7. The tripotassium cyanurate solution was continuously agitated one minute prior, during, and one minute after the introduction the gaseous chlorine in order to insure complete and thorough contacting of the chlorine with the cyanurate. The cyanurate solution was also maintained at a temperature of about 25° C. by circulating brine at a temperature of −29° C. through the jacket of the container. Toward the end of the chlorination step, it was noted that gas bubbles were forming quite readily on the surface of the cyanurate solution. A portion of this gas was collected and analyzed and was found to contain $N_2$, $CO_2$, and $NH_3$.

After the chlorination, i.e., the biuret decomposition, had been completed, the cyanurate solution was agitated for one minute and then the agitator turned off, and a sample of the cyanurate solution removed in order that a biuret analysis could be made. The biuret level in the cyanurate solution was determined to be approximately 101 parts per one million parts of the cyanuric acid in the tripotassium cyanurate. The substantially biuret-free tripotassium cyanurate solution was then removed from said container and filtered and cooled to a temperature of 29–30° C. Approximately 900 ml. of an aqueous slurry having a pH of about 4.5 and containing about 10% by weight of said penta-isocyanurate was charged to the chlorination vessel described in Example I heretofore set forth. The outlet tube which extended vertically downward into said vessel a distance of 10″ from the bottom thereof had its lowermost end at the top surface of the 900 ml. of slurry and enabled the maintainment of a constant volume of 900 ml. by the procedure hereinafter described.

The cooled tripotassium cyanurate solution was then introduced continuously into the aqueous slurry positioned in the vessel, with agitation, and concurrently gaseous chlorine was introduced into the aqueous slurry in an amount and at a rate sufficient to maintain the pH therein at 4.5 and to maintain a constant temperature of 29° C. The volume of the aqueous slurry in the container was maintained constant at 900 ml. by continually pumping a portion of the aqueous slurry, which contained a portion of said penta-isocyanurate, from the vessel through the outlet or removal tube. The rate of pumping was sufficient to permit the chlorination of 40 mls. of the slurry per minute while maintaining the volume constant at 900 ml. The resulting chlorinated slurry, which contained the said penta-isocyanurate which was additionally formed therein, was collected in a glass carboy. The continuous chlorination reaction was continued for one hour or until 3300 ml. of the liquid slurry had been chlorinated. The collected chlorinated slurry (i.e. 3300 mls.) was then filtered through a filter paper on a Buchner funnel. The resulting filter cake was then washed 3 times with 20 ml. increments of distilled water and dried to a constant weight in an oven at 100° C. The product consisted of 330 grams of a white crystalline material with a buff colored tinge which quantity amounted to a product yield of 89% based on the tripotassium cyanurate employed. This product was found to contain 66.9% of available chlorine. A chemical analysis, i.e. elemental analysis, X-ray diffraction pattern and infrared absorption spectra, of the crystalline compound derived from the aforementioned procedure showed said compound to be similar to the said penta-isocyanurate produced by Example III of the U.S. Patent 3,150,132. A particle size distribution and a biuret analysis were conducted on said crystalline product and the results thereof are listed below.

Example III was repeated in the same manner as set forth above with the exception that the biuret removal step was omitted. (This comparative run or repeat procedure is similar to the process disclosed in Example III of U.S. Patent 3,150,132.) A sample of the pre-washed filter cake so produced by this comparative run was also dried in a similar manner as set forth immediately above and the results of a screen analysis, i.e. particle size distribution, of these (biuret-containing) penta-isocyanurate crystals are also shown below.

|  | Present Invention | Similar to Prior Art, e.g. U.S. 3,150,132 Example III |
|---|---|---|
| Biuret Content, p.p.m. (based on cyanuric acid): |  |  |
| In cyanuric acid | 1,275 | 1,275 |
| In tripotassium cyanurate: |  |  |
| (a) Before biuret removed | 1,271 | 1,220 |
| (b) After biuret removed | 101 | ¹1,198 |
| "Penta-isocyanurate" Particle Size Distribution |  |  |
| U. S. Standard Screen (cumulative values), percent: |  |  |
| On 100 mesh | 34 | 1 |
| On 140 mesh | 69 | 4 |
| On 170 mesh | 83 | 9 |
| On 200 mesh | 93.4 | 19 |
| −200 mesh | 6.6 | 81 |
| "Penta-isocyanurate" Yield (based on the amount of tripotassium cyanurate employed) | 89 | 75 |

¹ No biuret removal step employed.

Example IV

Fifty-six grams of calcium hydroxide were dispersed in 131.7 grams of water and the resulting product mixed at room temperature (25° C.) with a dispersion consisting of 65.4 grams of cyanuric acid (containing 1100 parts of biuret per one million of said acid) and 261.6 grams of water to form an aqueous dispersion containing 154 grams of tricalcium dicyanurate. This dispersion which had a pH of 12.5 was introduced into the container which is described in Example I. (A sample of said di-cyanurate was analyzed to contain 1091 parts of biuret per one million parts of said di-cyanurate.) While maintaining the pH of said dicyanurate at 12.5 by the introduction, when required, of a sufficient amount of a 40% by weight NaOH solution, the tri-calcium dicyanurate soltuion was contacted with approximately 0.5 grams of trichlorocyanuric acid in order to decompose the biuret therein. After 5 minutes of mechanical agitation, a sample was analyzed and showed the biuret level to the 86 p.p.m.

The said dicyanurate was then chlorinated (in a similar manner as that described in Example I) with gaseous chlorine for about 40 minutes at a temperature which varied within the range of between 30° C. and 50° C. and until the pH of the slurry or solution was 4.0. The chlorine was introduced into the dispersion at a rate and the brine temperature was sufficiently low such that the dispersion temperature was about 40° C. In this process, 116 grams of chlorine were used corresponding to 120% more than the amount of chlorine theoretically required.

The products of this reaction consisted of an aqueous reaction mixture which consisted of trichlorocyanuric acid in the form of a slurry and an aqueous solution of calcium chloride having a pH of 4.0. This slurry was cooled to 25° C. by utilization of the brine circulating through the (heat transfer) jacket of the container. After cooling, the contents of said container were removed therefrom and the aqueous solution of calcium chloride was separated from the trichlorocyanuric acid slurry by a vacuum operated, drum filter. The resultant trichlorocyanuric acid filter cake was then washed with cold water (5° C.) in order to remove the residual calcium chloride. The filter cake was then washed with two 25-gram portions of acetone in order to remove the water therein. The cake was then carefully spread out in a 8″ x 8″ x 1″ flat pan and dried under a heat lamp for 10 minutes. After drying, the product was analyzed and found to contain 85% of available chlorine. A total yield of 110 grams of trichlorocyanuric acid was obtained, representing a yield of 92% based on the tricalcium dicyanurate charged. A portion of the above resultant was then subjected to a particle size distribution analyses, the results of which are shown below.

The above procedure was repeated without the biuret removal step (i.e., similar to the prior art U.S. 3,178,429 Example I) and the results of this repeat art also set forth below.

|  | Present Invention | Similar to Prior Art, e.g., U.S. 3,178,429 Example I |
|---|---|---|
| Biuret Content, p.p.m. (based on cyanuric acid): |  |  |
| In cyanuric acid | 1,100 | 1,100 |
| In tricalcium dicyanurate: |  |  |
| (a) Before biuret removed | 1,091 | 1,089 |
| (b) After biuret removed | 86 | ¹1,089 |
| Trichlorocyanuric Acid Particle Size Distribution |  |  |
| U. S. Standard Screen (cumulative values), percent: |  |  |
| On 100 mesh | 6.8 | 2 |
| On 140 mesh | 40.2 | 11 |
| On 170 mesh | 66.70 | 18 |
| On 200 mesh | 96.4 | 25 |
| −200 mesh | 3.6 | 75 |
| Trichlorocyanuric Acid Yield (based on the amount of tricalcium dicyanurate employed) | 92 | 86 |

¹ No biuret removal step employed.

In order to demonstrate the criticality of pH of the feed solution, i.e. the cyanurate, from which biuret is removed before chlorination, Example III of U.S. Patent 2,969,360 was repeated. In general, this patent discloses the production of trichlorocyauric acid in a two-stage, continuous operation. Specifically, Example III (U.S. 2,969,360) relates to the partial chlorination of a NaOH-cyanuric acid feed solution in a first-stage reactor wherein the pH was held at 9 by controlling the rate of chlorine feed. The product slurry overflowed from the first stage into the second stage wherein the rate of chlorination was such as to maintain a pH therein of about 2.5. In the repeat of this Example III, cyanuric acid was used which contaid approximately 1000 parts of biuret per one million parts of said acid. (It will be noted that there is no mention in U.S. 2,969,360 regarding the biuret content of the cyanuric acid used. Consequently, it is possible to assume that pure cyanuric acid was used.) After one hour's operation at steady-state conditions, the product overflow from the first stage was sampled, analyzed and was found to contain 850 p.p.m. of biuret.

A particle size distribution analyses showed that approximately 61% by weight of all the particles passed through a No. 200 mesh U.S. Standard screen. It will be noted that the retention time of each particle of the overflow from the first stage was subjected to chlorination therein at a pH 9 for a period of 37 minutes. This latter facet of the above operation is contrasted to the present invention wherein biuret is removed from the feed solution (which is maintained at a pH of at least 10.5, preferably 12.0–13.8, during such removal) by contacting said solution with any available chlorine-containing compound for a period of from about 7 to 30 minutes. Furthermore, in the present invention, the biuret removal step is conducted prior to any chlorination of the feed solution to produce dichloro- or trichloro-cyanuric acid. It is believed that once partial and/or total chlorination of the feed solution occurs, the biuret remains unreacted, i.e., undecomposed, due to the greater affinity of the chlorine for the cyanurate in the feed solution. The above is a mere belief and the applicant does not wish to be limited thereby. However, and in any event whatever the reaction mechanism, the end result of proceeding along the teachings of U.S. 2,969,360 is that if biuret is present in the cyanuric acid it will not be substantially removed by a partial chlorination of the feed solution at a pH of 9 which is the maximum pH taught therein; note column 3, lines 25–28.

In view of the aforementioned examples and the repeat of Example III of U.S. 2,969,360, it can readily be seen that the present invention is a significant contribution to the art and more particularly is an improvement thereover.

What is claimed is:

1. A process for reducing the biuret content of cyanuric acid containing substantial quantities of biuret as an impurity therein which comprises (1) reacting an aqueous solution containing a metallic compound selected from the group consisting of alkali metal hydroxides and alkaline earth metal hydroxides, oxides, and carbonates with said cyanuric acid to form a metal salt cyanurate solution; and (2) contacting said cyanurate solution with a chlorine-liberating compound for a sufficient period of time to substantially decompose the biuret in said cyanurate solution without materially chlorinating the said cyanurate while continuously maintaining the pH of said cyanurate solution at not less than 10.5.

2. The process as set forth in claim 1 wherein (1) the metallic compound is sodium hydroxide which is reacted with a sufficient quantity of cyanuric acid to form trisodium cyanurate; (2) the contact time of the chlorine-liberating compound with the cyanurate solution is at least 5 minutes; and (3) the temperature of said cyanurate solution is ont in excess of 90° C. during said contact time.

3. The process as set forth in claim 2 wherein (1) the pH of the cyanurate solution when in contact with the said chlorine-liberating compound is from about 12 to about 13.8; (2) said chlorine-liberating compound is a chlorocyanuric acid; and (3) said chlorocyanuric acid is used in an amount sufficient to provide a weight ratio of chlorocyanuric acid to biuret of from about 1.5:1 to about 4:1.

4. The process as set forth in claim 2, wherein the resulting cyanurate solution is treated with a sufficient quantity of a mineral acid to precipitate cyanuric acid of low biuret content.

5. In a process for preparing a polychlorocyanuric acid compound which comprises (1) reacting an aqueous solution containing a metallic compound selected from the group consisting of alkali metal hydroxides and alkaline earth metal hydroxides, oxides, and carbonates with cyanuric acid containing at least 200 parts per million of biuret as an impurity therein, to form a metal salt cyanurate solution and (2) subsequently contacting said cyanurate solution with a sufficient quantity of chlorine at a temperature less than 50° C. to form, at a pH less than 6.5, the aforementioned polychlorocyanuric acid compound, the improvement which comprises contacting said cyanurate solution with a chlorine-liberating compound prior to step (2) for a sufficient period of time to substantially decompose the biuret in said cyanurate solution without materially chlorinating the said cyanurate while continuously maintaining the pH of said cyanurate solution at not less than 10.5.

6. A process for preparing a chlorocyanuric acid which comprises (1) reacting an aqueous alkaline solution containing a metallic compound selected from the group consisting of alkali metal hydroxides and alkaline-earth metal hydroxides, oxides, and carbonates, with cyanuric acid, which contains at least about 200 parts per million biuret as an impurity therein, to form a metal salt cyanurate solution; (2) contacting said cyanurate solution, which contains the biuret therein, with a chlorine-liberating compuond for a sufficient period of time to substantially decompose the biuret in said cyanurate solution without materially chlorinating the said cyanurate while continuously maintaining the pH and temperature of said cyanurate solution at not less than 10.5 and not more than 90° C., respectively, whereby the chlorine liberated from said compound decomposes said biuret into materials which do not chemically or mechanically interfere with the subsequent process steps; and (3) subsequently contacting the substantially biuret-free, metal salt cyanurate solution with a sufficient quantity of chlorine in a reaction zone which is maintained at a temperature less than 50° C. to form, at a pH less than 6.5, the aforementioned chlorocyanuric acid.

7. The process as set forth in claim 6 wherein (1) the metallic compound is potassium hydroxide which when reacted with sufficient amounts of said cyanuric acid forms a solution containing dipotassium cyanurate; (2) the cyanurate solution, which contains biuret therein, is maintained at pH of from about 12 to about 13.8 during the time, which is at least 5 minutes, said chlorine-liberating compound is contacted with said cyanurate solution; (3) said chlorine-liberating compound is dichlorocyanuric acid and is used in an amount sufficient to provide a weight ratio of dichlorocyanuric acid to biuret of from about 1.5:1 to about 4:1 and (4) the reaction zone is maintained at a pH of not more than 4.5 during the chlorination and the end product formed is dichlorocyanuric acid.

8. The process as set forth in claim 6 wherein (1) the metallic compound is sodium hydroxide which when reacted with sufficient amounts of said cyanuric acid forms a solution containing trisodium cyanurate; (2) the cyanurate solution, which contains biuret therein, is maintained at a pH of from about 12 to about 13.8 and a temperature of from about 10° C. to about 75° C. during the time, which is at least 5 minutes, said chlorine-liberating compound is contacted with said cyanurate solution; (3) said chlorine-liberating compound is trichlorocyanuric acid and is used in an amount sufficient to provide a ratio of trichlorocyanuric acid to biuret of from about 1.5:1 to about 4:1; and (4) the reaction zone is maintained at a pH below 4.5 during the chlorination and the end product formed is trichlorocyanuric acid.

9. A process for preparing dichlorocyanuric acid which comprises (1) reacting an aqueous solution of potassium hydroxide with a sufficient amount of cyanuric acid, which contains at least about 200 p.p.m. biuret as an impurity therein, to form an aqueous solution of dipotassium cyanurate; (2) contacting said cyanurate solution, which contains the biuret therein, with a quantity of dichlorocyanuric acid for a period of time of from about 7 to about 30 minutes, whereby the biuret in said cyanurate solution is substantially decomposed without materially chlorinating the said cyanurate, which continuously maintaining the pH and temperature of said cyanurate solution at from about 12 to about 13.8 and from about 10° C. to about 75° C., respectively, whereby the chlorine liberated in said solution from the dichlorocyanuric acid decomposes said biuret into materials which do not chemically or mechanically interfere with the subsequent process steps, said quantity of dichlorocyanuric acid being used to provide a weight ratio of dichlorocyanuric acid to biuret of from about 2:1 to about 3:1; and (3) subsequently contacting the substantially biuret-free dipotassium cyanurate solution with a sufficient amount of gaseous chlorine in a reaction zone, which is maintained at a temperature of from about 10° C. to about 50° C., to form, at a pH of from about 2.0 to about 4.1, the aforementioned dichlorocyanuric acid.

10. A process for preparing [(mono-trichloro)tetra (monopotassium dichloro)]penta - isocyanurate which comprises (1) reacting an aqueous solution of potassium hydroxide with a sufficient amount of cyanuric acid, which contains at least about 200 parts per million biuret as an impurity therein, to form an aqueous solution of tripotassium cyanurate; (2) contacting said cyanurate solution, which contains the biuret therein, with a quantity of said penta-isocyanurate for a period of time of from about 7 to about 30 minutes, whereby the biuret in said cyanurate solution is substantially decomposed without materially chlorinating the said cyanurate, while continuously maintaining the pH and temperature of said cyanurate solution at from about 12 to about 13.8 and from about 10° C. to about 75° C., respectively, whereby the chlorine liberated in said solution from the said penta-isocyanurate decomposes said biuret into materials which do not chemically or mechanically interfere with the subsequent process steps, said quantity of said penta-isocyanurate being used to provide a weight ratio of said penta-isocyanurate to biuret of from about 2:1 to about 3:1; and (3) subsequently contacting the substantially biuret-free tripotassium cyanurate solution with a sufficient amount of chlorine in a reaction zone, which is maintained at a temperature of from about 0° C. to about 50° C., to form, at a pH of not less than 4.3 to less than 6.0, the aforementioned penta-isocyanurate.

11. The process as set forth in claim 6 wherein (1) the metallic compound is an alkaline-earth metal hydroxide which when reacted with cyanuric acid in a molar ratio of about 3:2, respectively, forms an aqueous alkaline solution of a trialkaline-earth metal dicyanurate; (2) the substantially biuret-free dicyanurate solution is introduced into a reaction zone and continuously maintained therein at a temperature of from about 0° C. to about 50° C. during the time the chlorine-liberating compound is contacted with said dicyanurate solution; (3) the chlorine is introduced, subsequent to the biuret decomposition step, into said reaction zone and mechanically dispersed through said dicyanurate solution until the pH of said solution is below 4.0 thereby forming an aqueous reaction mixture in said reaction zone, having the aforedefined pH and comprising an aqueous slurry of trichlorocyanuric acid; and (4) the trichlorocyanuric acid thus formed is thereafter separated from the bulk of the aqueous phase of said slurry.

12. The process as set forth in claim 11 wherein (1) the said metal hydroxide is calcium hydroxide which when reacted with cyanuric acid forms an aqueous alkaline solution of tricalcium dicyanurate; (2) the dicyanurate solution, which contains biuret therein, is maintained at a pH of from about 12 to about 13.8 during the time, which is at least 5 minutes, the said chlorine-liberating is contacted with said solution; and (3) said chlorine-liberating compound is trichlorocyanuric acid and is used in an amount sufficient to provide a weight ratio of trichlorocyanuric acid to biuret of from about 1.5:1 to about 4:1.

References Cited
UNITED STATES PATENTS

| | | | |
|---|---|---|---|
| 3,150,132 | 9/1964 | Symes | 260—248 |
| 3,178,429 | 4/1965 | Vazopolos | 260—248 |

JOHN D. RANDOLPH, *Primary Examiner.*

J. M. FORD, *Assistant Examiner.*